United States Patent Office 3,242,474
Patented Mar. 22, 1966

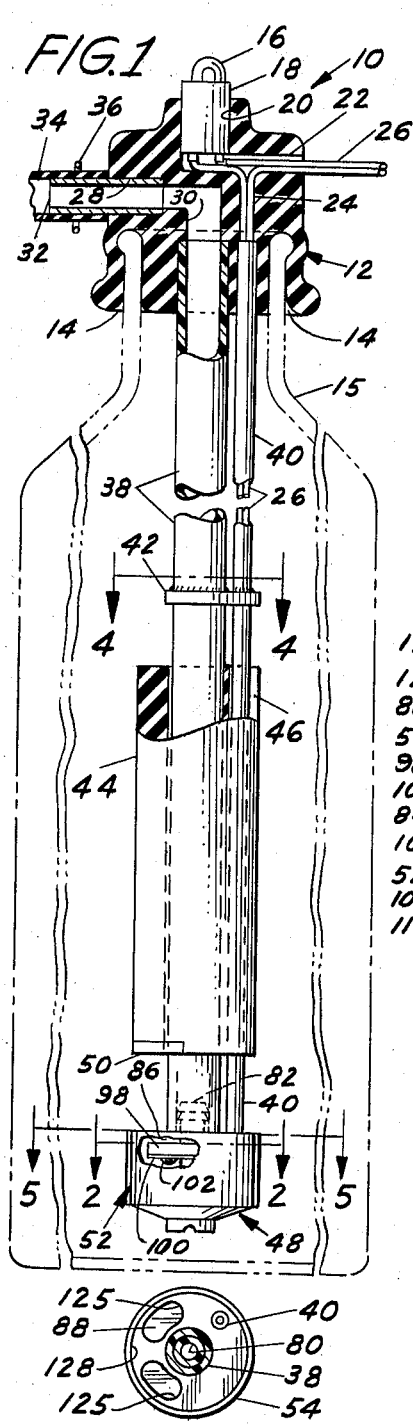
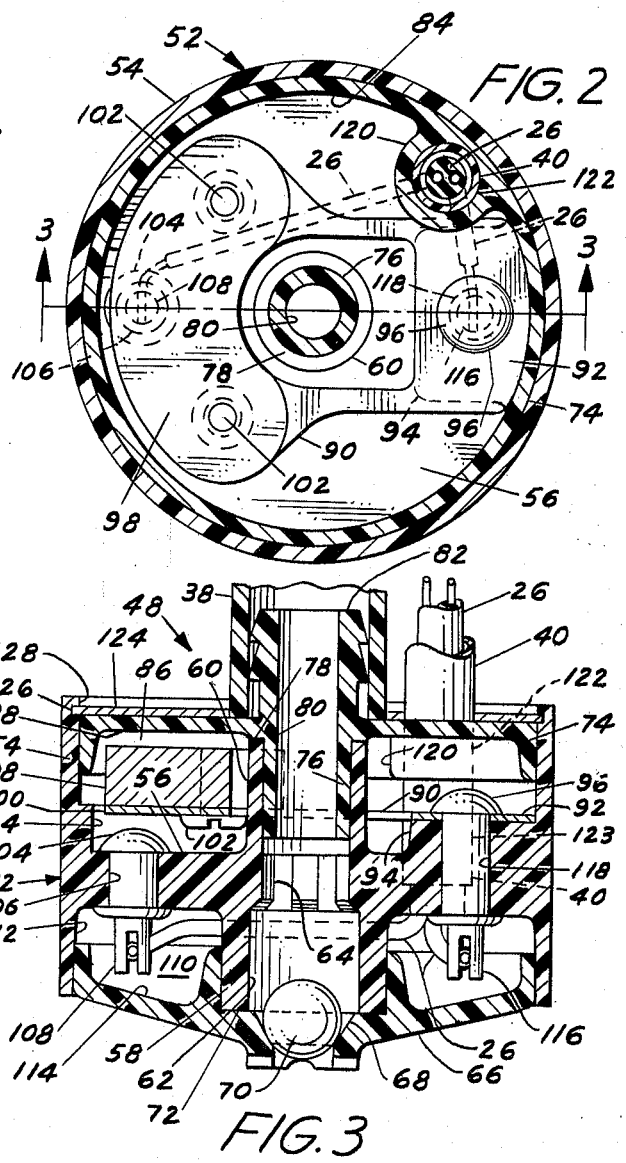
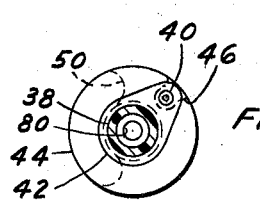

3,242,474
FLUID DISPENSER AND LEVEL INDICATOR
Gordon G. Gast, Madison Heights, and Frank C. Karasinski, Jr., Utica, Mich., assignors to Holley Carburetor Company, Warren, Mich., a corporation of Michigan
Filed Jan. 31, 1963, Ser. No. 255,239
6 Claims. (Cl. 340—244)

This invention relates generally to the dispensing of fluids from containers, and more specifically to novel means, which may be associated with the dispensing means, for indicating that the fluid level in the container is too low.

There are many structures wherein it is desirable to indicate, by signal light, buzzer, bell, or some other device, that the level of the fluid in a container is too low, and various float-operated electric switches have been proposed for this and other similar purposes.

One example of a structure wherein fluid level is important is the chemical container used in a disinfecting system for a marine toilet. However, this application presents some unique problems. In the first place, the liquid level in the disinfectant container of such a system is subject to temporary disturbances due to a rough sea, etc.; this could result in repeated unnecessary opening and closing and possible failure of certain previously proposed switches. Secondly, and even more important, the usual disinfecting solution—Clorox, for example—is highly corrosive to most metals that could be used in an electrical switch structure. Thus, to avoid certain and early failure of the switch mechanism, it is necessary to completely isolate the switch mechanism from the disinfecting fluid.

Another problem is introduced by the fact that it may be desirable to design the disinfecting system in a manner such that the container in which Clorox is sold, rather than a special container, may be employed so that refilling empty containers may be eliminated by substituting a new full bottle for the empty one. In this case, a further problem is introduced by the fact that the neck of the bottle is so small that the buoyant force of the largest diameter float that could be inserted through the neck may not be sufficient to operate a known type switch located outside the container so as to eliminate the corrosion problem.

Accordingly, an object of this invention is to provide a fluid level indicating device that may be inserted directly into the container in which the fluid is sold.

Another object of the invention is to provide such a device that may be associated with the fluid dispensing mechanism.

Still another object of the invention is to provide an electrical type of fluid level indicating device in which the elements of the electric circuit and the switch are sealed so that the device may be immersed in a corrosive fluid.

Another object of the invention is to provide an electric switch that is magnetically operated in response to some fluid level sensing means.

A still further object of the invention is to provide a float-responsive, magnet-operated electric switch in which both the switch contacts and the float member do not respond to vibration or temporary disturbances in fluid level, but only to such actual and substantial changes in the level of the fluid involved as would occur upon emptying or refilling the container.

Still another object of the invention is to provide a magnet-operated switch having means to lock the switch in either the opened or the closed position until a condition exists that is intended to cause a reversal thereof.

Another object of the invention is to provide a device of this kind that is inexpensive to manufacture and assemble, efficient in operation and relatively free from failure.

These and other objects and advantages of the invention will become more apparent upon reference to the following specification and accompanying drawings wherein:

FIGURE 1 is an elevational view of the invention, with portions thereof cut away and in partial cross section;

FIGURE 2 is an enlarged cross-sectional view taken on the plane of line 2—2 of FIGURE 1 and looking in the direction of the arrows;

FIGURE 3 is a cross-sectional view taken on the plane of line 3—3 of FIGURE 2 and looking in the direction of the arrows;

FIGURE 4 is a cross-sectional view taken on the plane of line 4—4 of FIGURE 1 and looking in the direction of the arrows;

FIGURE 5 is a cross-sectional view taken on the plane of line 5—5 of FIGURE 1 and looking in the direction of the arrows.

Referring to the drawings in greater detail, FIGURE 1 illustrates the fluid level signaling system 10 as including a cap or cover 12 made from a special rubber or other suitable non-corroding material. The cover 12 is designed to include a circular or other suitably shaped recess portion 14 for receiving the top of a container 15 which may comprise a relatively large bottle.

A signal light 16 is inserted in an electrical receptacle 18 contained either in an opening 20 in the top of the cover 12, or at any other more convenient location. The signal light may, of course, be replaced or complemented by a buzzer or some other suitable device.

The cover 12 further contains branch passageways 22 and 24 which are located in such a manner as to permit wire leads 26 to extend from the electrical receptacle 18 and through the wall of the cover 12 above the top of the container for connection with a battery or other electric power source (not shown), and downwardly into the container 15 through the bottom face of the cover 12. The cover 12 further includes passageways 28 and 30, with the passageway 28 including a tubular connector 32 fitted therein and extending outwardly therefrom to which a flexible or other type tube 34 may be attached, as by a clamp 36. The other passageway 30 may have a rigid tube 38 fitted and supported therein and extending downwardly into the bottle or container 15.

A protective tube 40 of plastic or other suitable non-corroding material may surround the wire leads 26 and extend from the branch passageway 24 into the bottle. This tube 40, as well as the fluid conduit 38, may be maintained in a fixed relationship with one another by a retaining member 42 (FIGURE 4).

A float device 44, which may be generally cylindrical and also formed from plastic or other suitable non-corroding material, surrounds the tube 38 and includes a longitudinal notch 46 so as to be freely slidable up and down the tubes 38 and 40 between the retainer 42 and a switch assembly 48 attached to the lower end of the two tubes 38 and 40. The float 44 includes a permanent magnet 50 fixedly mounted at its lower end, for a purpose which will be described later. It should be noted that positioning tube 40 in notch 46 prevents rotation of the float, and thus misalignment of the magnet 50.

As better seen in FIGURES 2 and 3, the switch assembly 48 includes a main body 52 also formed from a suitable non-corroding material. The main body 52 may comprise an outer cylindrical wall 54 and a central web section 56, with the latter having cylindrical projections 58 and 60 extending from the opposite sides thereof. An axial two-diameter passageway 62 extends through the two projections 58 and 60 and includes a ribbed or splined mid-section 64. A lower cover 66, which is formed so as to contain a central seat 68 for a ball check valve 70, abuts against the cylindrical projection 58 as at 72, and press-fits within the outer wall 54. An upper cover 74, also formed to include a cylindrical projection 76, may be inserted into the main body 52 to a predetermined depth, i.e., until it abuts against the cylindrical projection 60 as at 78. The passageway 80 through the cylindrical projection of the upper cover 74 is thus in alignment with both the axial passageway 62 extending through the main body 52 and the valve seat 68 in the lower cover 66. The upper cover 74 may further include a fitting-type extension 82 at the top thereof for connection with the tube 38 (FIG. 1). Main body 52 covers 66 and 74 and tubes 38 and 40 may be formed from the same non-corroding material, and they may be fusion or otherwise sealed so as to prevent the disinfecting solution from getting into any of the chambers formed thereby, except past check valve 70.

A cavity in the main body 52 forms a chamber 86 with a cavity 88 in the upper cover 74. A metallic cantilever bracket or beam 90, mounted at its one end 92 on a step 94 formed on the central web section 56 of the main body 52 and fastened thereto by means such as a rivet 96, extends horizontally across the chamber 86 and around the projection 60. A permanent magnet 98 (FIGURE 2) is mounted on the free end 100 of the beam 90 and fastened thereto, as by screws 102. A brass or other non-magnetic contact 104 is permanently mounted directly below the free end 100 of the beam 90 in an opening 106 through the central web section 56. A slotted end 108 of the contact 104 extends into a chamber 110 formed by cavities 112 and 114 in the main body 52 and the lower cover 66 respectively. The slotted end 116 of the rivet 96 likewise extends into the chamber 110 through an opening 118 in the web section 56, approximately 180° away from the contact 104.

A boss 120 (FIGURE 2) is formed along the inner side of the upper cover 74 in the chamber 86. An opening 122 extends through the boss 120; a second two-diameter opening 123, in line with the opening 122, extends through the central web section 56 to the lower chamber 110. The protective tube 40 and its enclosed wire leads 26 are inserted through the opening 122, the chamber 86, and into the opening 123. The ends of the wire leads 26, extending through the tube 40 and across the chamber 110 (FIGURE 2), are fixed in any suitable manner to the slotted ends 108 and 116 of the contact 98 and the rivet 96.

A steel or other ferromagnetic type plate 124, which may be formed with openings 125 and coated with a non-corroding material, is attached to the main body 52, as in a notch 126, above the upper cover 74 for a purpose which will be described later. The wall 54 extends a predetermined height 128 above the top of the plate 124, also for a purpose to be described later.

*Operation*

It should be understood that the invention is not in any way limited to use in a marine toilet; rather it may be used in any application where liquid is to be dispensed from a container and where it is desired to provide a signal that the liquid has been depleted.

In any event, it is contemplated that the switch assembly 48 and float 44 illustrated in FIGURE 1 would be inserted into a full container 15 and fastened therein by virtue of the inlet or neck portion of the container 15 being received in the recessed portion 14 of the cover 12, it being apparent that the cover 12 and recess 14 would be formed to fit the type of container intended to be employed. Provision for air leakage past the cover 12 would, of course, be required in order to prevent an air lock within the container 15.

In the assembled condition above described and with the container 15 full of fluid, the buoyant force of the float device 44 would cause it to be positioned against retainer 42, with its magnet 50 aligned directly above the magnet 98 in the switch assembly 48. The magnets 50 and 98 are, of course, mounted with their like poles positioned so that the magnets would repel each other. For example, magnet 50 could have its north pole at the bottom, and magnet 98 its north pole at the top. However, since the container is full and the magnet 50 is as far away as it can be from magnet 98, the repelling force of the magnets would be at a minimum, and magnet 98 would be attracted toward the steel plate 124 so as to be held against the under side of the upper cover member 74. The attraction of magnet 98 toward plate 124 would exist so long as there is sufficient fluid in the container 15, as will be discussed later.

The dispensing of liquid from container 15 would involve the lifting of the ball check valve 70, FIGURE 3, from its seat 68 in response to a suction communicated via flexible tube 34 extending from some pump mechanism (not shown), inlet tube 32, tube 38, and the axial passageways 80 and 62 in the switch assembly 48. The travel of the ball 70 would be limited by the splined mid-section 64, and the suction would cause the liquid in the container 15 to be transferred to some outside device (not shown) around the ball 70, through the splined section 64 and thence through the various passageways just mentioned. Once the suction subsides, the ball 70, by virtue of its own weight, would resume its position on the seat 68, thereby preventing escape of the liquid from tube 38, regardless of any pressure which might be applied thereto. It is possible, however, that the check valve 70 may not be required.

As dispensing of liquid from container 15 continues and the liquid level drops sufficiently so that the buoyant force of float 44 no longer holds float 44 against the retainer 42, the float will slide downwardly along tubes 38 and 40 until such time as the permanent magnet 50 on the float device 44 approaches within a predetermined distance from the permanent magnet 98 mounted on the cantilever beam 90 within the switch assembly 48. Once the predetermined critical spacing of the magnets is attained, the magnet 98 will be repelled downwardly by the approaching float magnet so as to bend the beam 90 downwardly until its free end 100 engages the contact 104. This will complete the electrical circuit and operate the light 16 or any other signal device, which may be mounted in any other suitable location such as on a control panel.

The need for additional fluid having thus been signaled, it would be a simple matter to remove the cover assembly 12 and its appended tubes 38 and 40, float 44 and switch assembly 48, to refill the container 15 and then to reinsert the device 10. Alternatively, the empty container 15 could be thrown away and a new full container could be substituted.

It is to be understood that the device 10 may be used on moving vehicles, and thereby subjected to vibration and other disturbances sufficient to cause the cantilever beam 90 having the mass of the magnet 98 mounted at its free end to be vibrated into engagement with the contact 104 even though the liquid level in the container 15 is still substantially high. It is to eliminate this possibility that the ferromagnetic plate 124 is provided above the upper cover 74. The magnet 98 will be continually attracted toward the plate and against the cover 74 until such time as this attraction is overcome by the repelling force of the float magnet 50, which is sufficient only when the level of the liquid is such that refilling the container 15 is required.

The possibility of the light 16 flickering, or a buzzer operating, as a result of the float bouncing due to temporary disturbances of the liquid is eliminated by virtue of the float magnet 50 being attracted to the plate 124 while sitting atop the wall 128. The height of the wall is determined by the degree of attractive force desired between the magnet 50 and the plate 124. While in this position, the magnet 98 will be retained against the contact 104.

This relationship is maintained until the container 15 is refilled.

From the above, it should be apparent that the invention embodies novel means, which may cooperate with portions of the liquid dispensing means, for detecting and signaling when the liquid in the container 15 drops to an undesirable level. Additional precautionary means are provided for assuring that the signal means will not be operated except in response to a low liquid level and for assuring that the signal means, once operated, will continue operation until the liquid is replenished.

The above "lock-in" feature for the magnets 50 and 98 is, of course, dependent upon a number of design factors such as the magnetic force of the magnets, the thickness and magnetic properties of plate 124, the spacing of the magnets with respect to the plate, the strength of the beam 90 and the buoyant force of the float 44. As previously mentioned, plate 124 may be formed with apertures 125 so as to prevent the magnetic lines of force from being effected by the ferromagnetic plate 124. In such a case, the web between the apertures and the metal defining the edges of the apertures would provide sufficient attraction for the magnets. It is also apparent that it may be desirable to coat the plate 124 and the magnet 50 so as to prevent corrosion thereof by the liquid in the container.

It should also be apparent that the invention embodies a compact sealed structure which is readily attachable to and removable from typical liquid containers 15, which may be immersed in corrosive liquids and which accomplishes the other objects stated above.

While only one modification of the invention has been illustrated and described, other modifications would, of course, be possible within the scope of the appended claims.

What we claim as our invention is:

1. A fluid level responsive switch for a fluid container, said switch comprising float means having a first magnet attached at the bottom end thereof, a body portion fixed near the bottom of said container, said body portion having a cantilever beam mounted therein, a second magnet oriented in repelling relation to said first magnet and rigidly attached to the movable end of said beam, a contact fixedly attached to said body portion below said beam for at times being contacted by said beam upon repulsion of said second magnet by said first magnet, and a ferromagnetic element fixedly positioned between said second magnet and said first magnet for holding said second magnet and said beam away from said contact until said first magnet has approached sufficiently close to said second magnet so that the repelling force of said magnets overcomes the attraction between said second magnet and said ferromagnetic element.

2. A fluid level responsive switch for a fluid container, said switch comprising float means having a first magnet attached at the bottom end thereof, a body portion fixed near the bottom of said container, said body portion including a cantilever beam rigidly fastened at its one end, a second magnet oriented in repelling relation to said first magnet and rigidly attached to the movable end of said beam, a contact fixedly attached to said body portion below said beam for at times being contacted by said beam upon repulsion of said second magnet by said first magnet, a ferromagnetic element fixedly positioned between said second magnet and said first magnet for holding said second magnet and said beam away from said contact until said first magnet has approached within a predetermined distance from said second magnet, an axial passageway through said body portion and a fluid conduit extending upwardly from said passageway through said float means and through a cover device for said fluid container.

3. A magnet-operated electric switch responsive to a fluid level, said switch comprising a sealed housing having a fixed and a movable contact therein, said movable contact having a magnet secured thereto, a float member supported for movement in accordance with fluid level toward and away from said housing, said float member having a magnet secured to the end thereof adjacent said housing and aligned with said magnet secured to said movable contact, said magnets being oriented so that the like poles thereof are adjacent one another, the arrangement of the claimed elements being such that movement of said float toward said housing due to a lowering of the fluid level closes said contacts due to the repelling force of said like poles and a ferromagnetic element positioned between said magnets so as to hold said switch open due to the attraction of said ferromagnetic element and said magnet secured to said movable contact except when said attraction is overcome by the repelling force of said like poles, said ferromagnetic member also serving to attract said magnet secured to said float and hold said switch closed.

4. A combined dispenser and level indicator device for a container from which fluid is to be dispensed, said device comprising a cover for said container, a dispensing tube extending from said cover and into said container, a hermetically sealed housing secured to said tube near the bottom of said container in a manner to prevent fluid from entering said housing, a conductor conduit extending between said housing and said cover, a float member having passages therethrough receiving said dispensing tube and said conductor conduit so as to be guided in its vertical travel with changing fluid levels and so as to prevent rotation of said float about its vertical axis, said housing containing an electric switch including a movable contact, said float and said movable contact each having a magnet secured thereto, said magnets being oriented with their like poles adjacent so as to repel, whereby movement of said float toward said housing when the fluid level drops causes said switch to close, and a ferromagnetic element positioned between said magnets so as to hold said switch open when said float moves away from said housing due to a rising fluid level.

5. A fluid dispensing and level detecting and signalling mechanism for a fluid container, said mechanism comprising a float having a first magnet secured to the bottom edge thereof, a hermetically sealed housing located near the bottom of said fluid container, said housing containing a second magnet having a contact surface secured thereto and a stationary contact, and a ferromagnetic element secured to the outer upper face of said housing, said second magnet being movable between said stationary contact and the wall of said housing adjacent said ferromagnetic element, said ferromagnetic element serving to attract said second magnet at all times that said float is more than a predetermined distance therefrom notwithstanding vibrations of said fluid container and said housing, said ferromagnetic element also serving to attract said first magnet at all times that said float is within said predetermined distance notwithstanding temporary disturbances of the liquid level, said first magnet while being thus attracted to said ferromagnetic element also serving to repel said second magnet and to thereby retain said first contact in continued contact with said second contact.

6. In combination with the device described in claim 5, a means associated with said float and said housing for permitting fluid to be dispensed from said container.

References Cited by the Examiner

UNITED STATES PATENTS

| | | | |
|---|---|---|---|
| 2,600,581 | 6/1952 | Schenendorf | 200—87.3 |
| 2,908,778 | 10/1958 | Strandberg | 200—87.3 XR |
| 2,927,175 | 3/1960 | Booth et al. | 200—84.3 |
| 2,927,176 | 3/1960 | Auld et al. | 200—84.3 XR |
| 2,980,775 | 4/1961 | Crain | 200—84 |

FOREIGN PATENTS

| | | |
|---|---|---|
| 568,090 | 12/1958 | Canada. |

NEIL C. READ, *Primary Examiner.*